United States Patent
Tsai et al.

(10) Patent No.: US 11,539,049 B2
(45) Date of Patent: Dec. 27, 2022

(54) POLYMER-MODIFIED SILICON-CARBON COMPOSITE AND USE THEREOF

(71) Applicant: ETERNAL MATERIALS CO., LTD., Kaohsiung (TW)

(72) Inventors: Lin Jen Tsai, Kaohsiung (TW); Chiyu Huang, Kaohsiung (TW); Chihhsien Wang, Kaohsiung (TW)

(73) Assignee: ETERNAL MATERIALS CO., LTD., Kaohsiung (TW)

( * ) Notice: Subject to any disclaimer, the term of this patent is extended or adjusted under 35 U.S.C. 154(b) by 0 days.

(21) Appl. No.: 16/527,194

(22) Filed: Jul. 31, 2019

(65) Prior Publication Data

US 2020/0044255 A1    Feb. 6, 2020

(30) Foreign Application Priority Data

Jul. 31, 2018  (TW) ................................ 107126595

(51) Int. Cl.
| | |
|---|---|
| *H01M 4/38* | (2006.01) |
| *H01M 4/62* | (2006.01) |
| *H01M 4/133* | (2010.01) |
| *H01M 4/134* | (2010.01) |
| *H01M 4/36* | (2006.01) |
| *H01M 4/587* | (2010.01) |
| *H01M 10/0525* | (2010.01) |
| *H01M 4/02* | (2006.01) |

(52) U.S. Cl.
CPC .......... *H01M 4/628* (2013.01); *H01M 4/133* (2013.01); *H01M 4/134* (2013.01); *H01M 4/366* (2013.01); *H01M 4/386* (2013.01); *H01M 4/587* (2013.01); *H01M 4/625* (2013.01); *H01M 10/0525* (2013.01); *H01M 2004/027* (2013.01)

(58) Field of Classification Search
CPC .................................................. H01M 4/628
See application file for complete search history.

(56) References Cited

U.S. PATENT DOCUMENTS

| | | |
|---|---|---|
| 2015/0325839 A1 | 11/2015 | Put et al. |
| 2017/0092939 A1 | 3/2017 | Kim et al. |
| 2020/0280061 A1 | 9/2020 | Deng et al. |

FOREIGN PATENT DOCUMENTS

| | | | |
|---|---|---|---|
| CN | 108054368 A | * | 5/2018 |
| EP | 3 618 151 A1 | | 3/2020 |
| JP | 2015-210960 A | | 11/2015 |
| JP | 2015210960 | * | 11/2015 |
| JP | 2016-507859 A | | 3/2016 |
| JP | 2017-063026 A | | 3/2017 |
| KR | 20140120751 A | | 10/2014 |
| KR | 20160149862 A | | 12/2016 |
| TW | 1624981 B | | 5/2018 |
| TW | 1611623 B | | 11/2018 |
| WO | 2019/114556 A1 | | 6/2019 |
| WO | 2018/199265 A1 | | 4/2020 |

OTHER PUBLICATIONS

Office Action of counterpart Japanese application JPA 2019-141174 dated Sep. 23, 2020 by the Japan Patent Office and an English translation thereof.
JP 017-063026 A _ Bibliographic_data.
JP 2015-210960 A _ Bibliographic_data.
JP 2016-507859 A _ Bibliographic_data.
WO 2019/114556 A1 _ Bibliographic_data.
WO 2018/199265 A1 _ Bibliographic_data.
Taiwanese Office Action an English translation of the Search Report.
Espacenet English Abstract of TW 1611623 B—Jan. 11, 2018.
Espacenet English Abstract of TW 1624981 B—May 21, 2018.
Korean First Office Action and an English translation thereof.
KR20160149862 A—English Abstract.
KR20140120751 A—English Abstract.

* cited by examiner

*Primary Examiner* — Ula C Ruddock
*Assistant Examiner* — Thomas H. Parsons
(74) *Attorney, Agent, or Firm* — Ladas & Parry LLP

(57) ABSTRACT

The present invention provides a silicon-carbon composite which contains a body having a core-shell structure and a polymer modification layer. The core of the body contains a silicon-containing particle. The shell of the body is a carbon encapsulation layer. The polymer modification layer is located on the external surface of the shell of the body and encapsulates the body. The polymer modification layer comprises a polymer selected from the group consisting of polyester, polyfluorocarbon, polyvinyl alcohol, polyacrylic acid, cellulose and a combination thereof.

8 Claims, No Drawings

POLYMER-MODIFIED SILICON-CARBON COMPOSITE AND USE THEREOF

BACKGROUND

1. Technical Field

The present invention relates to silicon-carbon composites for lithium battery negative electrodes, and more particularly to a polymer-modified silicon-carbon composite for a lithium battery negative electrode and use thereof.

2. Description of the Related Art

A secondary battery, also called rechargeable battery, is an electrochemical battery. Like a conventional battery, a secondary battery comprises a positive electrode, a negative electrode and an electrolyte composition, and during discharge, chemical energy is converted into electric energy by a chemical reaction. However, unlike a conventional battery, the chemical reaction of a secondary battery is a reversible reaction. After discharge of the secondary battery, the chemical reaction can be reversed by an external power supply to restore the chemically-changed substance to its original state, that is, charging. The charged secondary battery may be used again. Therefore, the secondary battery may be cyclically charged and discharged. Common secondary batteries available on the market include lead-acid batteries, nickel-cadmium batteries, nickel-metal hydride batteries, lithium-ion batteries and lithium-ion polymer batteries.

Lithium batteries are widely used as driving power sources for portable devices, in electric vehicles or as reserve power supply due to their relatively light weight, high capacity (high energy density), high working voltage, chargeable cycle and high cycle life. However, electrochemical batteries such as lithium batteries, even though repeatedly charged/discharged normally, may still have the problem of capacity degradation caused by factors such as material change and material loss.

Known negative electrode materials for lithium batteries include carbon-based materials such as graphite. The graphite has a good layered structure, and is favorable for intercalation and deintercalation of lithium ions. However, the theoretical capacity of the graphite is only 372 mAh/g, which prevents it from satisfying future market requirements. Among non-carbon-based negative electrode materials, the high theoretical capacity of silicon-based materials (4,200 mAh/g) has attracted considerable attention. The silicon-based materials commonly seen in the literature include Si, $SiO_x$, $SiO_2$, C—SiO and SiM (M: metal). When used as negative electrode materials for lithium batteries, most silicon-based materials are composited with highly-conductive carbon materials such as graphite or carbon nanotubes, carbon nanofibers or graphene. However, the volume of a silicon-based material may expand and shrink greatly due to intercalation and deintercalation of lithium ions during a charge/discharge process, which causes unstable battery performance, result in disintegration of the negative electrode material and affects the capacity maintenance rate.

Therefore, developing a novel negative electrode material to increase the capacity and capacity retention rate of a lithium battery is the primary focus of research in this technical field.

SUMMARY

A main objective of the present invention is to provide a silicon-carbon composite which contains a body having a core-shell structure and a polymer modification layer. The core of the body contains a silicon-containing particle. The shell of the body is a carbon encapsulation layer. The polymer modification layer is located on the external surface of the shell of the body and encapsulates the body. The polymer modification layer includes a polymer selected from the group consisting of polyester, polyfluorocarbon, polyvinyl alcohol, polyacrylic acid (PAA), cellulose and a combination thereof.

Another objective of the present invention is to provide a lithium battery negative electrode which contains the above-mentioned silicon-carbon composite.

By using a polymer modification layer to encapsulate the body, the silicon-carbon composite of the present invention effectively addresses the shortcomings of known negative electrode material, and the resulting battery is endowed with the advantages of both high capacity and high cycle life.

A person of ordinary skill in the art will easily comprehend the basic spirit of the present invention and the technical means and preferred embodiments of the present invention with reference to the detailed description described hereinbelow.

The present invention provides the following advantages:

1. According to the present invention, using a carbon encapsulation layer prepared from at least one sugar alcohol substance further improves the first cycle coulombic efficiency; using a carbon encapsulation layer prepared from at least two sugar alcohol substances provides a space for volume change, thereby improving the electrochemical performance of a silicon-based negative electrode and facilitating increase of the capacity retention rate.
2. The organic substance is incompletely carbonized under the heat treatment according to the present invention, and the obtained battery has high capacity and high capacity retention rate (i.e., high cycle life).
3. According to the present invention, the polymer modification layer achieves a strong hydrogen bond action with Si and thus forms an elastic film (like an SEI film) which uniformly encapsulates the surface of Si. Therefore, by using the polymer modification layer of the present invention, the oxidation of silicon in the silicon-carbon composite can be inhibited, and the silicon-carbon composite would not easily crack during the intercalation and deintercalation of lithium ions, and the cycle life of the battery can be increased.

DETAILED DESCRIPTION

Terms used in the present invention are only adopted to describe the implementation aspects and not intended to limit the scope of protection of the present invention. For example, the term "a/an" used in the specification covers singular and plural forms, unless otherwise specifically explained.

The term "tap density" refers to a value obtained, after a specific container is packed with a certain amount of powder, by tapping the powder into a closely packed state (namely until the volume of the powder cannot be reduced further), measuring the volume of the powder and then dividing the weight of the powder by the measured volume.

Silicon-Carbon Composite

The silicon-carbon composite of the present invention contains a body having a core-shell structure. The body of the silicon-carbon composite of the present invention may be independently synthesized or be any suitable material, and the silicon-carbon composite of the present invention can be prepared by encapsulating the body with a specific polymer modification layer.

The silicon-carbon composite of the present invention is in a powder form and has an average particle size (i.e., D50) of 5 μm to 10 μm, for example, 5 μm, 6 μm, 7 μm, 8 μm, 9 μm or 10 μm. According to a preferred embodiment of the present invention, the silicon-carbon composite of the present invention has an average particle size of 5 μm to 8 μm and a D90<30 μm.

The average particle size (D50) and D90 are particle characteristics known to persons of ordinary skill in the art. D50 and D90 refer to the particle sizes where the cumulative volume of the particles in a cumulative particle size distribution curve reaches 50% and 90%, respectively. For example, D50=10 μm represents that particles with particle size of less than or equal to 10 μm in the powder account for 50% of the volume of all powder particles. In the present invention, the silicon-carbon composite has a D50 as defined above and a D90<30 μm (for example, <28 μm, <25 μm, <20 μm or <15 μm), preferably, a D90<20 μm, and more preferably, a D90<15 μm. In the present invention, D50 and D90 are obtained by using a dynamic light scattering analyzer (DLS) to analyze the particle size distribution of the powder.

The silicon-carbon composite of the present invention has a tap density of 0.2 g/cm$^3$ to 0.6 g/cm$^3$, for example, 0.2 g/cm$^3$, 0.3 g/cm$^3$, 0.4 g/cm$^3$, 0.5 g/cm$^3$ or 0.6 g/cm$^3$. The tap density of the silicon-carbon composite of the present invention can be measured, for example, after carrying out 200 times of oscillations under the frequency of one time per 3 seconds and gravity of 300 gw by using a PREMAPT-20 powder oscillation gravitometer.

<<Silicon-Containing Particle>>

The core of the body having a core-shell structure in the present invention is a silicon-containing particle, for example, Si, SiO$_x$, SiO$_2$, C—SiO or SiM (M: metal).

According to an embodiment of the present invention, the silicon-containing particle may be elementary silicon, a silicon-oxygen compound represented as SiO$_x$ (0<x≤2), a silicon-containing solid solution or a silicon-containing intermetallic compound.

According to an embodiment of the present invention, the silicon-containing solid solution or the silicon-containing intermetallic compound contains silicon and another element, wherein the other element is at least one element selected from elements in Group IIA, elements in Group IIIV, transition metal elements and elements in Group IVA except Si of the periodic table of elements.

For increasing gram capacity of a negative electrode when the silicon-carbon composite is used for the negative electrode, the content of the silicon-containing particle is preferably in a range from 55 wt % to 80 wt %, for example, 55 wt %, 60 wt %, 65 wt %, 70 wt %, 75 wt % or 80 wt %, based on the total amount the silicon-carbon composite being 100 wt %. More preferably, the content of the silicon-containing particle is in a range from 60 wt % to 75 wt %, based on the total amount of the silicon-carbon composite being 100 wt %.

According to an embodiment of the present invention, the average particle size of the silicon-containing particle is in a range from 200 nm to 1,000 nm, for example, 200 nm, 300 nm, 400 nm, 500 nm, 600 nm, 700 nm, 800 nm, 900 nm or 1,000 nm.

<<Carbon Encapsulation Layer>>

The shell of the body having a core-shell structure in the present invention is a carbon encapsulation layer.

The thickness of the carbon encapsulation layer of the present invention is not specifically limited, and for example, may be 0.01 μm to 10 μm, for example, 0.01 μm, 0.05 μm, 1 μm, 3 μm, 5 μm, 7 μm, 9 μm or 10 μm. The thickness of the carbon encapsulation layer may be adjusted to achieve the following effects: preventing the exposure of the silicon-containing particle which may result in an interaction between the silicon-containing particle and the lithium ions in the electrolytic solution during discharge and enabling the lithium ions in the electrolytic solution to pass through the carbon encapsulation layer and interact with the silicon-containing particle during charge, to increase the capacity.

Preferably, the content of pyrolytic carbon is in a range from 0.1 wt % to 30 wt %, for example, 0.1 wt %, 0.5 wt %, 1 wt %, 5 wt %, 10 wt %, 15 wt %, 20 wt %, 25 wt % or 30 wt %, based on the total amount of the silicon-carbon composite being 100 wt %. More preferably, the content of the pyrolytic carbon is in a range from 0.5 wt % to 20 wt %, based on the total amount of the silicon-carbon composite being 100 wt %.

In the present invention, the term "pyrolytic carbon" refers to a product obtained by pyrolysis of a carbon precursor (organic substance) under a high-temperature, oxygen-free environment.

The carbon encapsulation layer includes pyrolytic carbon. According to an embodiment of the present invention, the carbon encapsulation layer includes pyrolytic carbon formed by carbonizing at least one organic substance selected from the group consisting of water soluble polyvinyl alcohol, carboxymethyl cellulose (CMC), sugar alcohol substance, polydextrose, cellulose and starch.

According to a preferred embodiment of the present invention, the carbon encapsulation layer is a sugar alcohol substance, and the sugar alcohol substance is selected from one or more of a monosaccharide compound, a disaccharide compound, a trisaccharide compound and a polysaccharide compound, and is preferably a monosaccharide compound, a disaccharide compound or a mixture thereof.

The monosaccharide compound is selected from one or more of xylose, erythritol, isomalt, glucose, fructose, galactose and ribose.

The disaccharide compound is selected from one or more of maltose, sucrose, trehalose and lactose.

Silicon-based material has the advantages of relatively high capacity and low discharge potential, and is one of the most promising materials for high-energy-density lithium-ion batteries at present. However, silicon may expand greatly in volume (~300%) after intercalation of lithium, which causes damage to it structure, so it is difficult to form a continuous and stable solid-electrolyte interface (SEI). This shortcoming greatly restricts the use of silicon-based negative electrode materials in practical batteries. The inventors of this application found through extensive research that using a carbon encapsulation layer prepared from at least one sugar alcohol substance further improves the first cycle coulombic efficiency. For example, when a carbon encapsulation layer prepared from monosaccharide is used, a stable SEI film can be formed on the surface of a carbon shell, which is favorable for improving coulombic efficiency. In addition, the inventors of this application also found that, when a carbon encapsulation layer prepared from at least two sugar alcohol substances is used, the carbon shell provides a space for volume change, thereby improving the electrochemical performance of a silicon-based negative electrode and facilitating increase of the capacity retention rate.

According to a preferred embodiment of the present invention, the sugar alcohol substance is selected from the group consisting of xylose, erythritol, isomalt, trehalose, glucose and a combination thereof.

According to a preferred embodiment of the present invention, the carbon encapsulation layer contains pyrolytic carbon formed by carbonizing at least one organic substance selected from the group consisting of xylose, erythritol, isomalt, trehalose and glucose. More preferably, the carbon encapsulation layer contains pyrolytic carbon formed by carbonizing at least one organic substance selected from the group consisting of xylose, erythritol, isomalt and trehalose.

According to another preferred embodiment of the present invention, the carbon encapsulation layer contains pyrolytic carbon formed by carbonizing trehalose and at least one organic substance selected from the group consisting of xylose, isomalt and erythritol.

According to another preferred embodiment of the present invention, the carbon encapsulation layer contains pyrolytic carbon formed by carbonizing erythritol and at least one organic substance selected from the group consisting of trehalose, xylose and isomalt.

According to an embodiment of the present invention, the carbon encapsulation layer of the present invention contains pyrolytic carbon formed by carbonizing trehalose and erythritol.

According to an embodiment of the present invention, the carbon encapsulation layer of the present invention contains pyrolytic carbon formed by carbonizing erythritol and xylose.

According to an embodiment of the present invention, the carbon encapsulation layer of the present invention contains pyrolytic carbon formed by carbonizing erythritol and isomalt.

According to an embodiment of the present invention, the carbonization degree of the organic substance may be adjusted by controlling the operating temperature and time for heat treatment. The organic substance in the present invention may be completely carbonized or incompletely carbonized, and the obtained pyrolytic carbon has a carbonization ratio of 5 wt % to 20 wt %, and preferably 10 wt % to 15 wt %. For example, the carbonization ratio of 10 wt % means that 10 grams of pyrolytic carbon is produced when every 100 grams of organic substance is carbonized at a high temperature.

According to an embodiment of the present invention, the operating temperature for heat treatment is 250° C. to 800° C. (preferably 300° C. to 650° C.), the operating time is 1 to 10 hours (preferably 2.5 to 7 hours) and the organic substance is incompletely carbonized. The carbon encapsulation layer is measured by use of X-ray photoelectron spectroscopy, and the ratio of the integral area of a characteristic peak of $sp^2$ carbon to the total integral area of characteristic peaks of carbon is in a range from 0.5 to 0.7 (for example, 0.5, 0.55, 0.58, 0.6, 0.65, 0.68 or 0.7), wherein the total integral area of the characteristic peaks is the total integral area of the characteristic peaks of C1s orbital. The characteristic peaks of the C1s orbital in X-ray photoelectron spectroscopy are peaks at positions where binding energy is 280 eV to 298 eV, including a characteristic peak of the $sp^2$ carbon, a carbon characteristic peak of C—OH or a carbon characteristic peak of C=O. When the ratio of the integral area of the characteristic peak of the $sp^2$ carbon to the total integral area of the characteristic peaks of carbon is 0.5 to 0.7 (for example, 0.5, 0.55, 0.58, 0.6, 0.65, 0.68 or 0.7), the obtained battery has high capacity and high capacity retention rate (i.e., high cycle life).

<<Polymer Modification Layer>>

The silicon-carbon composite of the present invention contains a polymer modification layer, and the polymer modification layer is located on the external surface of the shell of the body and encapsulates the body.

The inventors of this application found that encapsulating the body with the polymer modification layer can avoid oxidation of silicon, effectively ameliorate the shortcoming that the volume of the silicon-based negative electrode material changes greatly in a charge/discharge process and endow the obtained battery with high capacity and high capacity retention rate (i.e., high cycle life), thereby effectively solving the problems in the art.

The polymer modification layer of the present invention contains a polymer selected from the group consisting of polyester, polyfluorocarbon, polyvinyl alcohol, polyacrylic acid, cellulose and a combination thereof, and preferably a polymer selected from the group consisting of polyester, polyvinyl alcohol, polyacrylic acid and a combination thereof.

According to a preferred embodiment, the polyester is a thermoplastic polyester which is a linear polyester obtained by polymerization of a binary acid and a binary alcohol and may contain specific functional groups, for example, a sulfonate ester group (—$SO_3M$ where M is methyl or ethyl) and/or a carboxyl group (—COOH).

According to a preferred embodiment, the polyester has a molecular weight (weight average molecular weight, Mw) in a range from 10,000 to 100,000, and preferably from in a range from 15,000 to 30,000.

According to a preferred embodiment, the polyvinyl alcohol has a molecular weight (weight average molecular weight, Mw) in a range from 50,000 to 200,000, and preferably from in a range from 110,000 to 140,000.

According to a preferred embodiment, the polyacrylic acid has a molecular weight (weight average molecular weight, Mw) in a range from 200,000 to 400,000, and preferably from in a range from 300,000 to 400,000.

According to a preferred embodiment, the polyfluorocarbon refers to an aqueous fluoropolymer coating resin with high weather resistance, for example, ETERFLON 43132AF. ETERFLON 43132AF belongs to an amorphous, aqueous fluorocarbon polymer, and the main structure thereof is a copolymer of a fluorolefin and a vinyl ether alternatively arranged in the polymer chain.

According to a preferred embodiment, the polyfluorocarbon has a molecular weight (weight average molecular weight, Mw) in a range from 10,000 to 100,000, and preferably from in a range from 50,000 to 100,000.

According to a preferred embodiment, the cellulose has a molecular has a molecular weight (weight average molecular weight, Mw) in a range from 200,000 to 700,000, and preferably from in a range from 500,000 to 650,000.

According to an embodiment of the present invention, the polymer modification layer contains polyester and polyvinyl alcohol.

According to an embodiment of the present invention, the polymer modification layer contains polyvinyl alcohol and polyacrylic acid.

According to an embodiment of the present invention, the polymer modification layer contains polyester and polyacrylic acid.

According to an embodiment of the present invention, the polymer modification layer contains polyester.

According to an embodiment of the present invention, the polymer modification layer contains polyvinyl alcohol.

According to an embodiment of the present invention, the polymer modification layer contains polyacrylic acid. The inventors of this application further found through extensive research that among the materials suitable for the polymer modification layer, polyacrylic acid is simple in molecular structure and easy to synthesize, and it may be attributed to its high carboxyl group content that polyacrylic acid achieves a strong hydrogen bond action with Si and thus forms uniform encapsulation (like an SEI elastic film) on the surface of Si, thereby inhibiting oxidation of silicon in the silicon-carbon composite and further increasing the cycle life of the battery.

The content of the polymer modification layer may be adjusted by a person of ordinary skill in the art according to needs. According to an embodiment of the present invention, the content of the polymer modification layer is in a range from about 5 wt % to about 15 wt %, for example, 5 wt %, 6 wt %, 7 wt %, 8 wt %, 9 wt %, 10 wt %, 11 wt %, 12 wt %, 13 wt %, 14 wt % or 15 wt %, based on the total amount of the silicon-carbon composite being 100 wt %. If the content of the polymer modification layer is lower than 5%, the silicon-carbon composite is likely to crack to decrease the capacity retention rate, and if the content exceeds 15%, the intercalation and deintercalation of lithium ions are worse, which thus affects the cycle life of the battery.

The silicon-carbon composite of the present invention is applicable to the negative electrode of a lithium battery.

<<Conductive Material>>

The silicon-carbon composite of the present invention may further contain a conductive material. The conductive material may be in the core or shell of the body, or both.

The conductive material may be used independently or in combination of two or more kinds thereof, and may be, but is not limited to, for example: a conductive polymer, such as polyethylenedioxythiophene (PEDOT), carbon black, graphite, graphene or carbon nanotubes (CNTs). Among the above-mentioned conductive material, only the conductive polymer has a thermal weight loss when heated at 250 to 600° C. Preferably, the conductive material is selected from carbon black, graphite, carbon nanotubes or any combination thereof.

According to an embodiment of the present invention, the content of the conductive material in the carbon encapsulation layer is in a range from 0.1 wt % to 10 wt %, and preferably from 0.5 wt % to 5 wt %, based on the total amount of the silicon-carbon composite being 100 wt %.

According to an embodiment of the present invention, when the conductive material of the present invention is present in the silicon-carbon composite, the thermal weight loss of the conductive material at 250 to 600° C. is between 0.001 wt % and 5 wt %, for example, 0.05 wt %, 0.06 wt %, 0.07 wt %, 0.08 wt %, 0.09 wt %, 0.1 wt %, 1 wt %, 2 wt %, 3 wt %, 4 wt % or 5 wt %.

According to an embodiment of the present invention, in the absence of a conductive polymer material (for example, PEDOT), the silicon-carbon composite of the present invention has a thermal weight loss between 5 wt % and 15 wt %, for example, of 5 wt %, 6 wt %, 7 wt %, 8 wt %, 9 wt %, 10 wt %, 11 wt %, 12 wt %, 13 wt %, 14 wt % or 15 wt %, based on the total amount of the silicon-carbon composite being 100 wt %, as measured under nitrogen at 250 to 600° C. in a thermogravimetric analysis (TGA) test. The thermal weight loss comes from the polymer modification layer.

According to an embodiment of the present invention, in the presence of the conductive polymer material (for example, PEDOT), the silicon-carbon composite of the present invention has a thermal weight loss between 5 wt % and 20 wt %, for example, of 5 wt %, 6 wt %, 8 wt %, 10 wt %, 12 wt %, 14 wt %, 15 wt %, 16 wt %, 18 wt % or 20 wt %, as measured under nitrogen at 250 to 600° C. in a thermogravimetric analysis (TGA) test. The thermal weight loss comes from the polymer modification layer and the polymer conductive material.

The TGA test may be conducted by use of a method known to those of ordinary skill in the art to analyze the silicon-carbon composite powder or the negative electrode plate coated with the silicon-carbon composite. As a non-limiting example, in the case of the negative electrode plate, the analysis may be performed by the following steps:

1. after removing copper foil from the (negative) electrode plate, placing the electrode plate in a beaker for an ultrasound water bath to strip the powder;
2. separating graphite, silicon-carbon composite and carbon black from each other by use of focused ultrasound (for example, 80 W, on 10 sec/off 10 sec);
3. sieving the resulting solution through a 500-mesh sieve and rinsing it with purified water several times to filter out carbon black and adhesive;
4. adding residual solids to purified water and sufficiently dispersing them, and then sieving the resulting solution through a 300-mesh sieve to filter out graphite (usually 15 to 25 μm); and
5. after draining the remaining filtrate, carrying out a thermogravimetric analysis (TGA) test to measure a thermal weight loss. For example, according to the method described in the examples of the present invention, a thermal weight loss of a sample may be obtained by increasing the temperature to 600° C. and continuing to apply heat for a period of time under a nitrogen atmosphere through a thermogravimetric analysis (TGA) device.

The inventors of this application have found that, unlike the adhesive (for example, carboxymethyl cellulose (CMC)) commonly used in the art, when polyvinyl alcohol or polyacrylic acid is used to prepare the polymer modification layer of the silicon-carbon composite, the resulting polymer modification layer can be firmly adhered on the silicon-carbon composite, so the silicon-carbon composite cannot be easily shattered or stripped by ultrasound and is insoluble to water. Therefore, whether the silicon-carbon composite (powder) contains a polymer modification layer formed by polyvinyl alcohol or polyacrylic acid can be ascertained by TGA.

Method for Preparing Silicon-Carbon Composite

The body of the silicon-carbon composite of the present invention may be independently synthesized or be any suitable material. The silicon-carbon composite of the present invention can be prepared by encapsulating the body with a specific polymer modification layer. For example, in an embodiment of the present invention (but the present invention should not be limited thereto), the body of the silicon-carbon composite of the present invention can be prepared by the following steps:

(a) providing a mixture containing a silicon-containing particle and at least one organic substance selected from the group consisting of water soluble polyvinyl alcohol, carboxymethyl cellulose, a sugar alcohol substance, polydextrose, cellulose, starch and a combination thereof; and
(b) heat treating the mixture to carbonize the at least one organic substance to form pyrolytic carbon and prepare the body of the silicon-carbon composite.

Preferably, the mixture in step (a) contains a silicon-containing particle and at least one organic substance selected from the group consisting of xylose, erythritol, isomalt, trehalose and glucose. Other preferred embodiments are as described above.

In another embodiment of the present invention, a conductive material may be optionally added into the mixture in step (a). Specifically, in step (a), the conductive material, the silicon-containing particle, the organic substance and water are mixed, and then water is removed to form the mixture. Water is used for dissolving the organic substance.

The operating temperature for heat treatment in step (b) is in a range from 250° C. to 600° C., and preferably between 300° C. and 580° C., and the operating time is 1 to 10 hours, preferably 3 to 5 hours and more preferably 4 hours.

The silicon-carbon composite of the present invention may be prepared by the following steps: mixing a body of the silicon-carbon composite with a hydrophilic polymer solution; and preparing a polymer modification layer encapsulating the body by rotary concentration or spray-drying, thereby obtaining the silicon-carbon composite of the present invention.

The hydrophilic polymer solution contains a polymer selected from the group consisting of polyester, polyfluorocarbon, polyvinyl alcohol, polyacrylic acid, cellulose and a combination thereof, preferably a polymer selected from the group consisting of polyester, polyvinyl alcohol, polyacrylic acid and a combination thereof.

As another example, according to an embodiment of the present invention, the method for preparing the silicon-carbon composite of the present invention includes the following steps:
mixing a body of the silicon-carbon composite with a hydrophilic polymer solution; and preparing a polymer modification layer by rotary concentration or spray-drying, the hydrophilic polymer solution containing a polymer selected from the group consisting of polyester, polyfluorocarbon, polyvinyl alcohol, polyacrylic acid, cellulose and a combination thereof.

The above method includes preparation of a body of the silicon-carbon composite by the following steps:
providing a mixture containing a silicon-containing particle and at least one organic substance selected from the group consisting of water soluble polyvinyl alcohol, carboxymethyl cellulose, a sugar alcohol substance, polydextrose, cellulose, starch and a combination thereof; and heat treating the mixture to carbonize the at least one organic substance to form pyrolytic carbon and prepare the body of the silicon-carbon composite.

According to an embodiment of the present invention, the hydrophilic polymer solution contains polyvinyl alcohol and polyacrylic acid.

According to an embodiment of the present invention, the hydrophilic polymer solution contains polyester and polyacrylic acid.

According to an embodiment of the present invention, the hydrophilic polymer solution contains polyester.

According to an embodiment of the present invention, the hydrophilic polymer solution contains polyvinyl alcohol.

According to an embodiment of the present invention, the hydrophilic polymer solution contains polyacrylic acid.

Optionally, the silicon-carbon composite prepared by rotary concentration or spray-drying as described above may be further processed by any suitable method, for example, being crushed in a crusher and/or being sieved, to reduce its size such that the silicon-carbon composite has an average particle size of 5 μm to 10 μm, for example, 5 μm, 6 μm, 7 μm, 8 μm, 9 μm or 10 μm, measured by use of a dynamic light scattering analyzer (DLS). Preferably, the silicon-carbon composite has an average particle size of 5 μm to 8 μm and D90<20 μm measured by use of a DLS.

Method for Preparing Negative Electrode

The present invention also provides a lithium battery negative electrode which contains the aforementioned silicon-carbon composite. The preparation method for the lithium battery negative electrode of the present invention is not specifically limited, and may be any proper method known to a person of ordinary skill in the art. For example, a lithium battery negative electrode can be prepared by adding the silicon-carbon composite of the present invention to a negative electrode material slurry, coating the slurry onto a substrate after sufficiently mixing, and then drying.

The substrate is, for example, but not limited to, copper foil.

Besides the silicon-carbon composite of the present invention, the negative electrode material slurry further contains a suitable carbon-based material known in the art, for example, graphite, graphene, carbon nanotubes or mesocarbon microbeads (MCMB), and an optional additive. The additive can be those known to a person of ordinary skill in the art, which are, for example, but not limited to, an adhesive, a tackifier or a conductive auxiliary material.

The adhesive is, for example, but not limited to, an ethylene-butadiene copolymer, methyl (meth)acrylate, ethyl (meth)acrylate, butyl (meth)acrylate, (meth)acrylonitrile, hydroxyethyl (meth)acrylate, acrylic acid, methacrylic acid, fumaric acid, maleic acid, polyvinylidene difluoride, polyethylene oxide, polyepichlorohydrin, polyphosphazene or polyacrylonitrile.

The tackifier is, for example, but not limited to, carboxymethyl cellulose, methyl cellulose, hydroxymethyl cellulose, ethyl cellulose, polyvinyl alcohol or starch.

The conductive auxiliary material is, for example, but not limited to, carbon black, graphite or other conductive substances. The conductive auxiliary material may be the same as or different from the aforementioned conductive material.

The amount of the silicon-carbon composite of the present invention is 1 wt % to 20 wt %, for example, 1 wt %, 2 wt %, 3 wt %, 4 wt %, 5 wt %, 6 wt %, 7 wt %, 8 wt %, 9 wt %, 10 wt %, 12 wt %, 14 wt %, 16 wt %, 18 wt % or 20 wt %, based on the total solids content of the negative electrode material slurry; the amount of the carbon-based material is 70 wt % to 99 wt %, for example, 70 wt %, 75 wt %, 80 wt %, 85 wt %, 90 wt %, 95 wt % or 99 wt %, based on the total solids content of the negative electrode material slurry; and the remaining is the additive(s). The amount of the additive is 0 wt % to 10 wt %, for example, 0 wt %, 1 wt %, 2 wt %, 3 wt %, 4 wt %, 5 wt %, 6 wt %, 7 wt %, 8 wt %, 9 wt % or 10 wt %, based on the total solids content of the negative electrode material slurry.

The negative electrode of the present invention may further be assembled with a lithium metal sheet (as positive electrode), a separator, an electrolytic solution, etc., to form a half battery. The composition of the separator and the electrolytic solution are not specifically limited, and is known to a person of ordinary skill in the art.

According to an embodiment of the present invention, when the negative electrode prepared from the silicon-carbon composite of the present invention is used, the obtained first cycle coulombic efficiency is higher than 90% and the capacity of the first cycle is higher than 440 mAh/g. In addition, since the silicon-carbon composite of the present invention has a polymer modification layer, the 50th-cycle capacity retention rate can be effectively increased to be higher than 80%. In consideration of mass production practicality, the embodiments having a 50th-cycle capacity retention rate higher than 85% are more preferred. Therefore, using the silicon-carbon composite of the present invention actually improves the capacity retention rate of the lithium battery.

The present invention will be described in connection with the following examples. The present disclosure may be implemented in other ways than the following examples without departing from the spirit of the present disclosure; and the scope of the present disclosure should not be explained merely in accordance with and limited by the disclosure.

EXAMPLES

Preparation of Silicon-Carbon Composite

Example 1

A First Preparation Step:

2 grams of carbon nanotubes (CNTs) (7321 provided by Cnano Technology), 20 grams of silicon powder with an average particle size of 0.5 to 0.7 μm (ANI720 provided by AUO Crystal Corp), 10 grams of erythritol and 10 grams of trehalose were mixed in a high speed mixer for 20 minutes at 3,000 rpm, then taken out, sieved through an 80-mesh stainless steel mesh and heated for 4 hours at 600° C. under nitrogen in a high temperature sintering furnace to be completely carbonized to prepare a body for the silicon-carbon composite. The body contains silicon powder, carbon nanotubes and a carbon encapsulation layer, the carbon encapsulation layer encapsulates the silicon powder and the carbon nanotubes are dispersed in the body and partially encapsulated by the carbon encapsulation layer.

A Second Preparation Step:

The body produced in the first preparation step was mixed with 0.8 grams of polyester (Eternal Materials, ETERKYD 50392-W-25), 0.8 grams of polyacrylic acid (Eternal Materials, Etersol 1730), 0.8 grams of polyvinyl alcohol (Chang Chun Chemicals, BF26) and 200 grams of water in a container of a homogenizer (manufacturer: Silverson; model number: L5M-A) for 0.2 hours at 1,000 rpm and then transferred to a rotary concentrator (manufacturer: BUCHI; model number: V-850) to remove water. A mixture (bulk) was obtained. The obtained mixture was crushed by use of a crusher and then sieved through a 400-mesh sieve to obtain silicon-carbon composite powder.

Examples 2 to 10 and Comparative Examples 11 to 14

The silicon-carbon composite of examples 2 to 10 and comparative examples 11 to 14 was prepared according to the method of example 1 based on the proportion recited in Table 1.

Preparation of Negative Electrode and Lithium Battery

MCMB: Mesocarbon Microbeads, MG12 provided by China Steel Chemical Corporation.

SBR: Styrene-Butadiene Rubber, TRD104N provided by JSR Corporation.

CMC: Carboxymethyl Cellulose, BVH8 provided by Ashland.

PAA: Polyacrylic acid, PAA450000 provided by Sigma-Aldrich.

The silicon-carbon composite prepared in the examples and comparative examples was mixed with other components in an aqueous solution according to the following proportion to produce a negative electrode material slurry: 88.3 wt % of MCMB, 4.7 wt % of the silicon-carbon composite, 0.67 wt % of PAA, 1.83 wt % of SBR, 1.5 wt % of CMC and 3 wt % of conductive carbon black (Super P provided by Taiwan Maxwave Co., Ltd.).

The negative electrode material slurry was blade-coated onto a copper foil (a copper foil of a 10 μm for battery; supplied by Changchun Co., Ltd.), dried at 100° C. for 5 minutes, and then pressed to prepare a negative electrode plate (where the density of the coating after pressing is 1.4 to 1.6 g/cm$^3$).

The negative electrode plate prepared in the examples and comparative examples was cut into small electrode plates, and assembled with other components in a glovebox under a high-purity argon atmosphere by a conventional method to form a CR2032 button-type half battery. The battery performance was tested. The components were assembled in an order of: bottom cover of the battery, lithium metal plate (as positive electrode), separator, negative electrode plate, metal gasket, leaf spring sheet and top cover of the battery. The electrolytic solution used was 1M LiPF$_6$ dissolved in a solution of ethylene carbonate (EC) and diethyl carbonate (DEC) mixed in a volume ratio of 1:1. The separator was a polypropylene film having a thickness of about 20 μm.

The assembled battery was allowed to stand for about 2 to 3 hours, so that the electrolytic solution sufficiently penetrated the electrode to increase the electrical conductivity, and the open circuit voltage of the obtained battery was about 2.5 to 3 V.

Test Method

Battery performance was measured using a charge and discharge machine (Model: LBT21084) available from Arbin Instruments.

Capacity:

The battery was charged/discharged at 0.1 C/0.1 C. During charge, a constant current (CC) section was carried out at 0.1 C for 10 hours, a constant voltage (CV) section was carried out at 0.01V for 1 hour (namely, a constant current (CC) charging was carried out until the voltage reaches 0.01V and then replaced by a constant voltage (CV) charging until the current is 1% of an original set current). Discharge was carried out at 0.1 C for 10 hours. The charge/discharge capacity of first three cycles was measured, thereby the first-cycle capacity of the battery can be obtained.

First-Cycle Coulombic Efficiency:

the discharge capacity of the first cycle/the charge capacity of the first cycle.

$50^{th}$-cycle retention rate: Then, the battery was charged/discharged cyclically at 0.2 C/0.5 C. During charge, a constant current (CC) section was carried out at 0.2 C for 5 hours, a constant voltage (CV) section was carried out at 0.01V for 1 hour (namely, a constant current (CC) charging was carried out until the voltage reaches 0.01V and then replaced by a constant voltage (CV) charging until the current is 1% of an original set current). Discharge was carried out at 0.5 C for 2 hours. The charge/discharge capacity of each cycle was measured, and then the capacity of the $50^{th}$ cycle was obtained.

The retention rate=(discharge capacity of the $50^{th}$ cycle/discharge capacity of the first cycle)×100%.

The 600° C. Pyrolysis Degree:

10 mg of the sample was taken and analyzed by the use of a thermogravimetric analysis (TGA) device (Q5000TGA of TA Instruments) under a nitrogen atmosphere at the following conditions: maintaining at 100° C. for 30 minutes and then increased to 600° C. at 20° C./min, after which maintaining at 600° C. for 120 minutes. The resulting weight difference is the 600° C. pyrolysis degree.

TABLE 1

|  |  | Examples |  |  |  |  |  |  |
|---|---|---|---|---|---|---|---|---|
|  |  | 1 | 2 | 3 | 4 | 5 | 6 | 7 |
| First preparation step | silicon (grams) | 20 | 20 | 20 | 20 | 20 | 20 | 20 |
|  | erythritol (grams) | 10 | 0 | 5 | 5 | 5 | 5 | 5 |
|  | trehalose (grams) | 10 | 10 | 5 | 5 | 5 | 0 | 0 |
|  | xylose (grams) | 0 | 0 | 0 | 0 | 0 | 0 | 5 |
|  | isomalt (grams) | 0 | 0 | 0 | 0 | 0 | 5 | 0 |
|  | glucose (grams) | 0 | 0 | 0 | 0 | 0 | 0 | 0 |
|  | CNTs (grams) | 2 | 1 | 1 | 1 | 1 | 1 | 1 |
|  | heat treatment (600° C./4 hr) | YES | YES | YES | YES | YES | YES | YES |
| Second preparation step | PAA (grams) | 0.8 | 0.8 | 0.8 | 0 | 0 | 0.8 | 0.8 |
|  | Polyester (grams) | 0.8 | 0 | 0 | 1.6 | 0 | 0 | 0 |
|  | Polyvinyl alcohol (grams) | 0.8 | 0.8 | 0.8 | 0 | 1.6 | 0.8 | 0.8 |
|  | Content of polymer modification layer (wt %) | 8.9 | 6.6 | 6.7 | 6.7 | 6.7 | 6.7 | 6.7 |
|  | Average particle size of silicon-carbon composite (μm), measured by DLS | 8.4 | 6.7 | 7.4 | 6.9 | 7.7 | 6.1 | 9.2 |
|  | First-cycle coulombic efficiency | 93% | 92.6% | 92.6% | 92.4% | 92% | 91% | 92.5% |
|  | First-cycle capacity (mAh/g) | 440 | 453 | 465 | 472 | 458 | 460 | 458 |
|  | $50^{th}$ cycle retention rate (0.2 C/0.5 C) | 91% | 92% | 94% | 90% | 88% | 90% | 89% |
|  | 600° C. pyrolysis degree | 10.3% | 6.1% | 6.3% | 5.9% | 6.5% | 6.7% | 6.1% |

|  |  | Examples |  |  | Comparative Examples |  |  |  |
|---|---|---|---|---|---|---|---|---|
|  |  | 8 | 9 | 10 | 11 | 12 | 13 | 14 |
| First preparation step | silicon (grams) | 20 | 20 | 20 | 20 | 20 | 20 | 20 |
|  | erythritol (grams) | 3 | 0 | 0 | 5 | 5 | 5 | 0 |
|  | trehalose (grams) | 3 | 0 | 0 | 5 | 5 | 5 | 0 |
|  | xylose (grams) | 0 | 0 | 5 | 0 | 0 | 0 | 0 |
|  | isomalt (grams) | 0 | 5 | 0 | 0 | 0 | 0 | 0 |
|  | glucose (grams) | 0 | 5 | 5 | 0 | 0 | 0 | 0 |
|  | CNTs (grams) | 0.6 | 1 | 1 | 1 | 1 | 1 | 1 |
|  | heat treatment (600° C./4 hr) | YES | YES | YES | YES | YES | YES | NO |
| Second preparation step | PAA (grams) | 0.8 | 0.8 | 0.8 | 0 | 0.3 | 2.4 | 0.8 |
|  | Polyester (grams) | 0 | 0 | 0 | 0 | 0 | 0 | 0 |
|  | Polyvinyl alcohol (grams) | 0.8 | 0.8 | 0.8 | 0 | 0.3 | 2.4 | 0.8 |
|  | Content of polymer modification layer (wt %) | 7.0 | 6.7 | 6.7 | 0 | 2.6 | 18 | 7.1 |
|  | Average particle size of silicon-carbon composite (μm), measured by DLS | 8.1 | 6.5 | 6.9 | 8.7 | 6.8 | 11.1 | 7.2 |
|  | First-cycle coulombic efficiency | 92.1% | 92.8% | 93.1% | 92.5% | 92.3% | 86% | 88% |
|  | First-cycle capacity (mAh/g) | 465 | 452 | 460 | 438 | 468 | 414 | 460 |
|  | $50^{th}$ cycle retention rate (0.2 C/0.5 C) | 86% | 82% | 81% | 78% | 72% | 61% | 58% |
|  | 600° C. pyrolysis degree | 6.1% | 5.6% | 6.7% | 1% | 2% | 16% | 5% |

From Table 1, it can be seen that the silicon-carbon composite of Examples 1 to 10 of the present invention has a polymer modification layer, and the resulting $50^{th}$-cycle capacity retention rate is higher than 80%, superior to that of Comparative Example 11. This indicates that using the silicon-carbon composite of the present invention actually improves the capacity retention rate of the lithium battery.

From Examples 1 to 8 and Examples 9 and 10, it can be seen that, compared with glucose (Examples 9 and 10), using erythritol, trehalose, xylose or isomalt to form the pyrolytic carbon further improves the $50^{th}$-cycle capacity to 88% or above.

In Example 2, 10 grams of trehalose was used. In Example 3, 5 grams of the 10 grams trehalose used in Example 2 was replaced by erythritol to prepare the carbon encapsulation layer. In contrast, no sugar alcohol substance was used for preparation of the carbon encapsulation layer in Comparative Example 14. The results show that the silicon-carbon composite of Examples 2 and 3 has a carbon encapsulation layer encapsulating the body, so that the first-cycle coulombic efficiency was greatly improved and the capacity retention rate was increased. Compared with using only one sugar alcohol substance (Example 2), using two sugar alcohol substances (Example 3) further improves the first-cycle capacity and the 50$^{th}$-cycle retention rate.

From the comparison between the results of Examples 3 and 4 and the comparison between the results of Examples 3 and 5, it can be seen that Example 3 uses the PAA as the polymer material and thus the 50$^{th}$-cycle retention rate can be further increased.

From the results of Example 3 and Comparative Examples 12 and 13, it can be seen that when the content of the polymer modification layer is insufficient (lower than 5 wt %) or excessive (higher than 15 wt %), the 50$^{th}$-cycle retention rate is decreased.

TABLE 2

|  | erythritol | trehalose | xylose | isomalt | glucose | CNT |
|---|---|---|---|---|---|---|
| carbonization ratio % | 10 | 15 | 12.8 | 12.3 | 11.6 | 100 |

Table 2 shows the carbonization ratio after sufficient carbonization of erythritol, trehalose, xylose, isomalt, glucose and CNT at 600° C.

What is claimed is:

1. A silicon-carbon composite, comprising a body having a core-shell structure and a polymer modification layer, wherein:
   (a) the core of the body is a silicon-containing particle, and the shell of the body is a carbon encapsulation layer; and
   (b) the polymer modification layer is located on the external surface of the shell of the body and encapsulates the body, and the polymer modification layer comprises a polymer selected from the group consisting of polyester, polyfluorocarbon, polyvinyl alcohol, polyacrylic acid, cellulose and a combination thereof,
   wherein the carbon encapsulation layer comprises pyrolytic carbon formed by incompletely carbonizing erythritol and at least one organic substance selected from the group consisting of trehalose, xylose and isomalt, and
   wherein the ratio of the integral area of a characteristic peak of sp$^2$ carbon to the total integral area of the characteristic peaks of C1s orbital measured by use of X-ray photoelectron spectroscopy for the carbon encapsulation layer is in a range from 0.5 to 0.7.

2. The silicon-carbon composite according to claim 1, wherein the content of the polymer modification layer is in a range from 5 wt % to 15 wt %, based on the total amount of the silicon-carbon composite being 100 wt %.

3. The silicon-carbon composite according to claim 1, which has a thermal weight loss between 5 wt % and 20 wt % at 250 to 600° C., as measured in a thermogravimetric analysis (TGA) test.

4. The silicon-carbon composite according to claim 1, wherein the pyrolytic carbon is formed by incompletely carbonizing erythritol and trehalose.

5. The silicon-carbon composite according to claim 1, further comprising a conductive material, wherein the conductive material is selected from the group consisting of a conductive polymer, graphite, graphene, carbon nano-tubes and any combination thereof, and the content of the conductive material is in a range from 0.1 wt % to 10 wt %, based on the total amount of the silicon-carbon composite being 100 wt %.

6. The silicon-carbon composite according to claim 1, wherein the silicon-containing particle comprises elementary silicon, a silicon-oxygen compound represented as SiO$_x$ (0<x≤2), a silicon-containing solid solution or a silicon-containing intermetallic compound.

7. The silicon-carbon composite according to claim 1, wherein the content of the silicon-containing particle is in a range from 55 wt % to 80 wt %, and the content of pyrolytic carbon is in a range from 0.1 wt % to 30 wt %, based on the total weight of the silicon-carbon composite being 100 wt %.

8. A lithium battery negative electrode, comprising the silicon-carbon composite according to claim 1.

* * * * *